(12) United States Patent
Allison et al.

(10) Patent No.: US 11,656,595 B2
(45) Date of Patent: May 23, 2023

(54) SYSTEM AND METHOD FOR MACHINE MONITORING

(71) Applicant: Caterpillar Inc., Peoria, IL (US)

(72) Inventors: Anthony W. Allison, Champaign, IL (US); Scott A. Zacek, Savoy, IL (US); Vijay K. Yalamanchili, Champaign, IL (US); Karl P. Schneider, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 82 days.

(21) Appl. No.: 17/004,546

(22) Filed: Aug. 27, 2020

(65) Prior Publication Data

US 2022/0066408 A1 Mar. 3, 2022

(51) Int. Cl.
| | | |
|---|---|---|
| *G05B 19/042* | (2006.01) | |
| *G06N 20/00* | (2019.01) | |
| *G01L 1/00* | (2006.01) | |
| *G01P 3/00* | (2006.01) | |
| *G01P 15/00* | (2006.01) | |

(52) U.S. Cl.
CPC ............ *G05B 19/0428* (2013.01); *G01L 1/00* (2013.01); *G01P 3/00* (2013.01); *G01P 15/00* (2013.01); *G06N 20/00* (2019.01); *G05B 2219/24015* (2013.01)

(58) Field of Classification Search
CPC ............................ G05B 19/0428; G06N 20/00
USPC ......................................................... 702/185
See application file for complete search history.

(56) References Cited

U.S. PATENT DOCUMENTS

| | | | |
|---|---|---|---|
| 10,288,530 B2 | 5/2019 | Sundermeyer et al. | |
| 10,466,690 B2 | 11/2019 | Unuma et al. | |
| 2015/0149047 A1* | 5/2015 | Kubota ................ | E02F 9/26 701/50 |
| 2016/0078363 A1* | 3/2016 | Hodel ................ | G05B 13/0265 706/12 |

(Continued)

OTHER PUBLICATIONS

Written Opinion and International Search Report for Int'l. Patent Appln. No. PCT/US2021/043108, dated Oct. 22, 2021 (13 pgs).

*Primary Examiner* — Ricky Go
(74) *Attorney, Agent, or Firm* — Bookoff McAndrews PLLC

(57) ABSTRACT

A method for monitoring operation of a machine includes receiving machine operation data including a first data channel indicative of a sensed condition at a first location on the machine, wherein the machine operation data is collected during one or more work cycles of the machine, and extracting at least a portion of the machine operation data, including data associated with the first data channel. The method also includes classifying the extracted machine operation data to identify one or more types of events that occurred during the one or more work cycles of the machine and involving an environment in which the machine operates during the one or more work cycles of the machine, estimating a condition at a second location on the machine during the one or more work cycles of the machine based on the identified one or more types of events, and logging the identified one or more types of events with a plurality of additional identified types of events to represent a plurality of work cycles during operation of the machine over time.

20 Claims, 11 Drawing Sheets

(56) References Cited

U.S. PATENT DOCUMENTS

| | | | |
|---|---|---|---|
| 2016/0098637 A1* | 4/2016 | Hodel | G05B 23/0221 |
| | | | 706/12 |
| 2016/0349152 A1 | 12/2016 | Sundermeyer et al. | |
| 2018/0224808 A1* | 8/2018 | Tong | G05B 19/404 |
| 2020/0007540 A1* | 1/2020 | Kawaguchi | H04L 9/088 |
| 2020/0143004 A1 | 5/2020 | Pateel | |

* cited by examiner

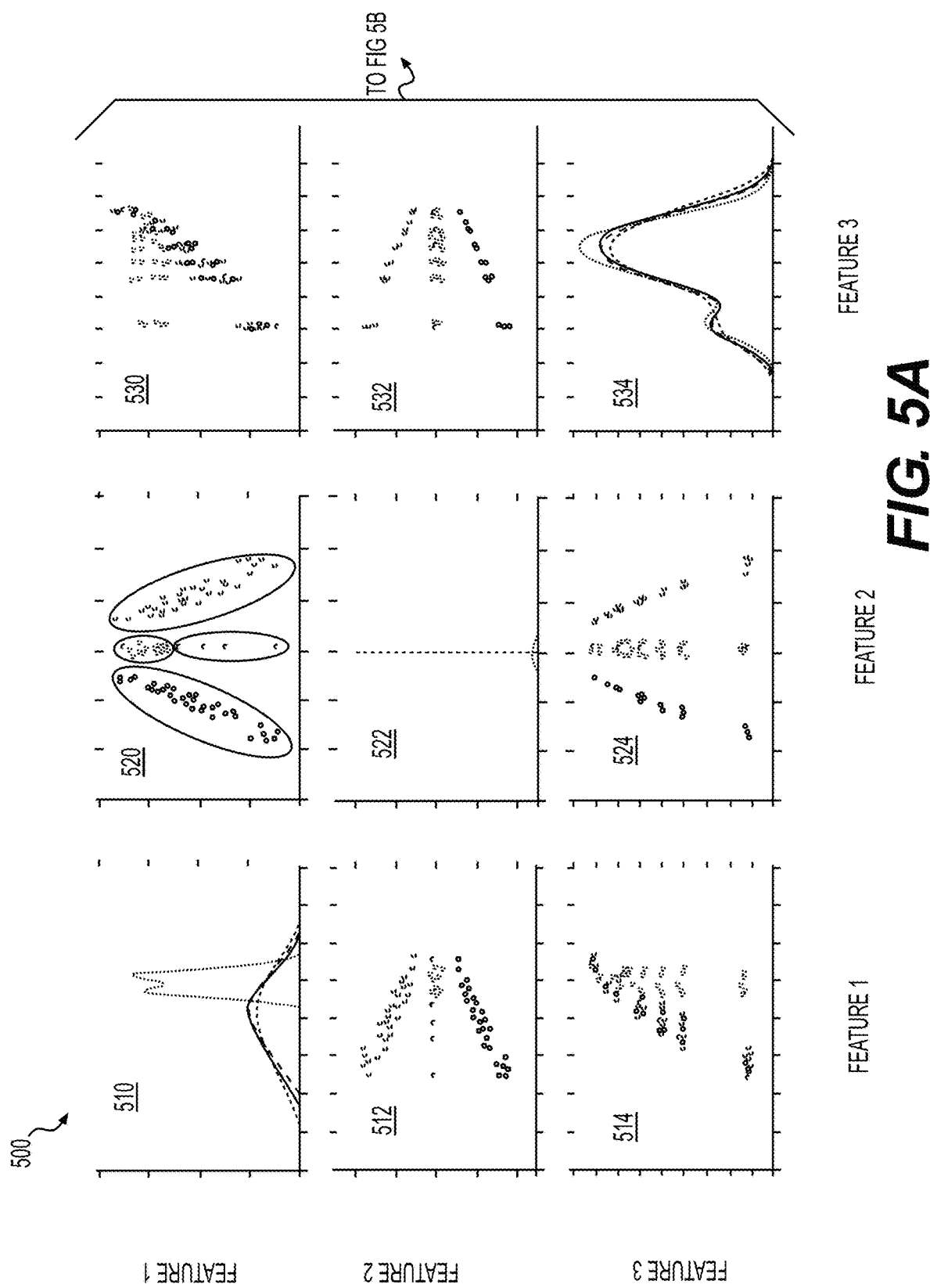

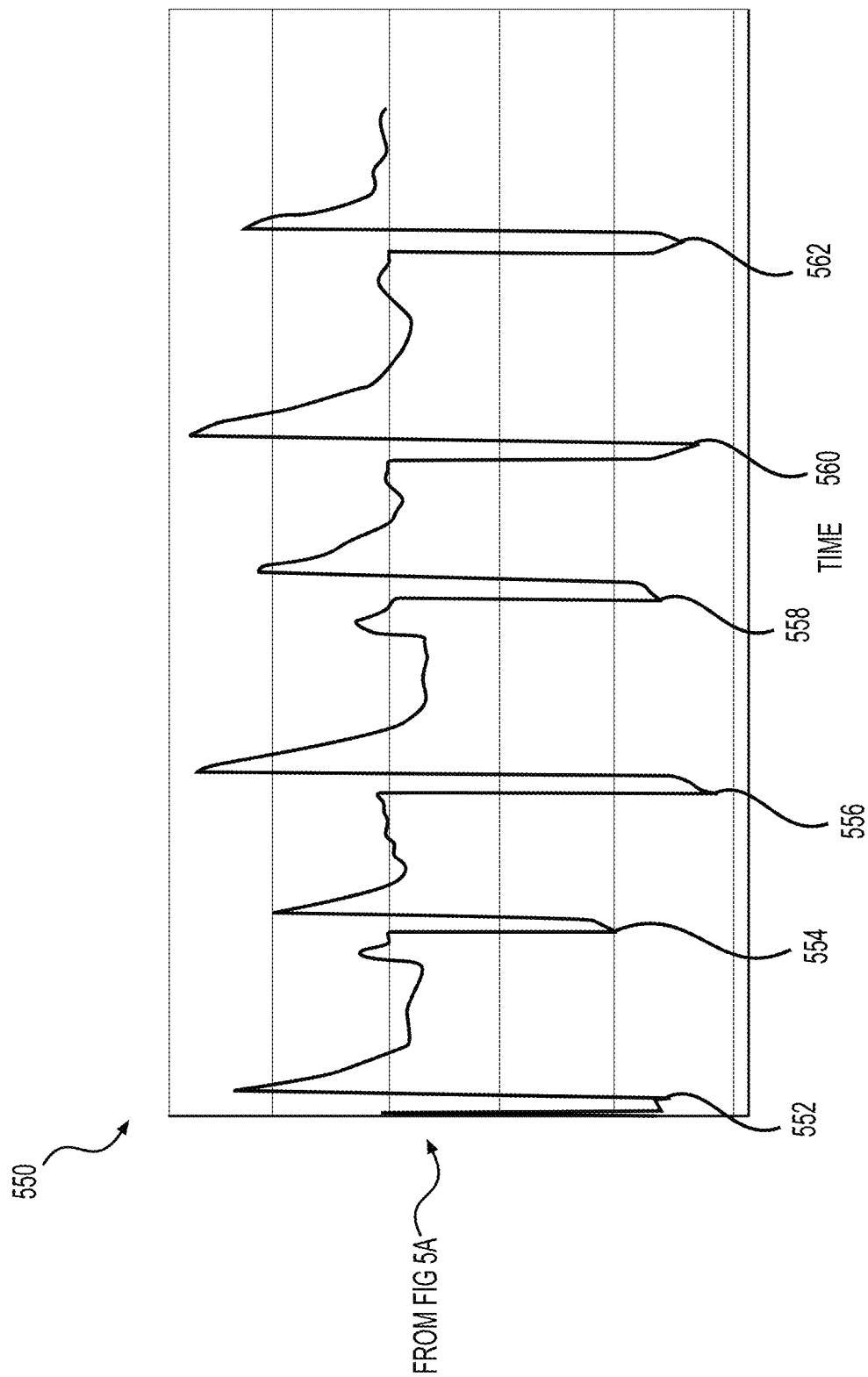

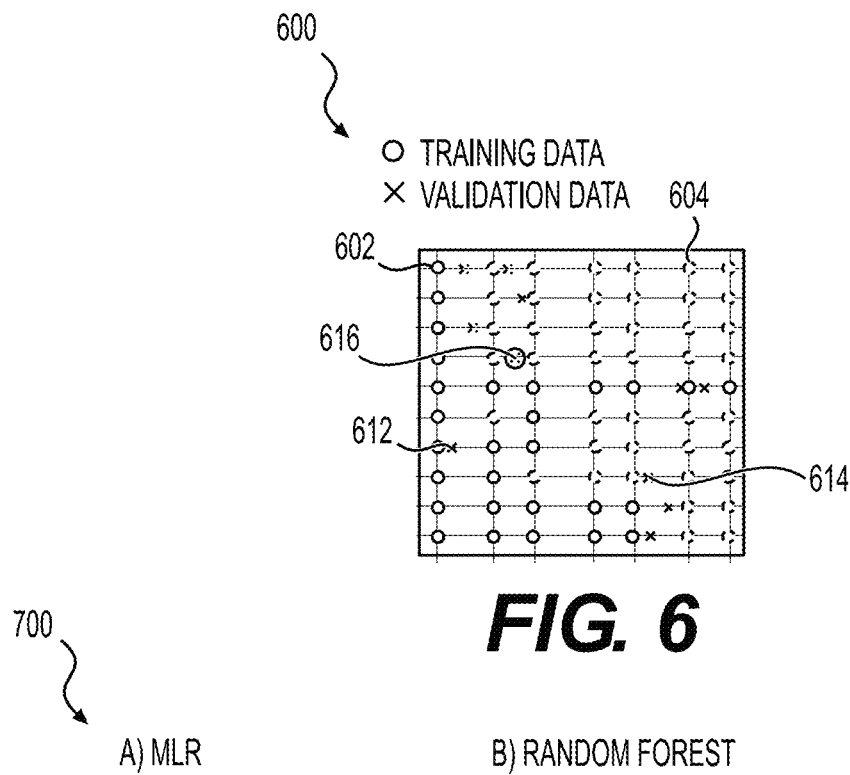
FIG. 6
A) MLR  B) RANDOM FOREST  C) NN MLP (200iter)
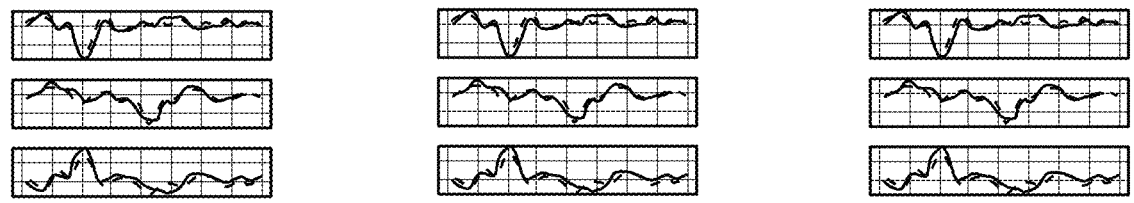
D) NN MLP (500iter)  E) RNN
FIG. 7

| EVENT | COMPOSITE | SEGMENT 1 | SEGMENT 2 | SEGMENT 3 | ... |
|---|---|---|---|---|---|
| DUMPING | 4 | 3.3 | 4.2 | 5.6 | ... |
| LOADING | 4 | 3.3 | 4.2 | 5.6 | ... |
| POTHOLES | 2 | 1 | 2.9 | 2.3 | ... |
| DITCHES | 3 | 4.1 | 2.5 | 2.6 | ... |
| TURNING | 2 | 4.2 | 1.1 | 1.9 | ... |
| ... | ... | ... | ... | ... | ... |

*FIG. 8*

SYSTEM AND METHOD FOR MACHINE MONITORING

TECHNICAL FIELD

The present disclosure relates generally to machine or work systems, and more particularly, to methods and systems for monitoring the operation of one or more machines.

BACKGROUND

Mobile machines (e.g., earthmoving equipment) and stationary machines (e.g., power-generation devices) are complex devices that include a large number of structural components that experience extreme forces and harsh conditions. Such machines, whether mobile or stationary, incorporate robust systems that allow the machine to perform one or more desired tasks or work (e.g., suspension systems, combustion systems, implement systems, power storage systems, etc.). Mobile machines, such as trucks (e.g., mining trucks, haul trucks, on-highway trucks, off-highway trucks, articulated trucks), excavators, wheel loaders, other earthmoving equipment, as well as other mobile machines, experience a wide variety of physical loads and changing environments. Machines may even experience damage based on the actions of an operator controlling the machine, especially when the machine is operated by relatively inexperienced operators.

To facilitate effective design, maintenance, and supervision of machines, machine systems, and/or machine components, it is desirable to consider work cycles that represent, for example, repeated tasks performed by the machine, especially tasks that tend to cause damage to the machine over time. It is also desirable to detect when a damaging event occurs during operation. However, such damaging events are typically monitored by sensors which are only capable of detecting extreme events, such as catastrophic failures or strong impacts. For example, a tip sensor may be able to determine that a tipping event occurred, and an accelerometer may detect a severe impact. These systems are not able to accurately determine smaller amounts of damage, and are often unable to meaningfully evaluate areas of the machine that do not include sensors.

An exemplary damage estimation device is disclosed in U.S. Pat. No. 10,466,690 B2 to Unuma et al. (the '690 patent). The '690 patent describes a device that estimates damage by determining changes in the operating status of a machine, for example, when an engine is running or the machine is stopped. These status changes may be insufficient to reflect events involving an environment in which the machine operates or other aspects of the operation of the machine. Additionally, the damage estimation device described in the '690 patent does not employ machine learning, which may reduce the accuracy, number, and/or types of tasks it is able to evaluate. Therefore, while the damage estimation device described in the '690 patent may be useful in some circumstances, it may be unable to accurately identify types of events that significantly affect the wear and/or damage accumulated in components of the machine.

The disclosed method and system may solve one or more of the problems set forth above and/or other problems in the art. The scope of the current disclosure, however, is defined by the attached claims, and not by the ability to solve any specific problem.

SUMMARY

In one aspect, a method for monitoring operation of a machine may include receiving machine operation data including a first data channel indicative of a sensed condition at a first location on the machine, wherein the machine operation data is collected during one or more work cycles of the machine, and extracting at least a portion of the machine operation data, including data associated with the first data channel. The method may also include classifying the extracted machine operation data to identify one or more types of events that occurred during the one or more work cycles of the machine and involving an environment in which the machine operates during the one or more work cycles of the machine, estimating a condition at a second location on the machine during the one or more work cycles of the machine based on the identified one or more types of events, and logging the identified one or more types of events with a plurality of additional identified types of events to represent a plurality of work cycles during operation of the machine over time.

In another aspect, a system for monitoring operation of a machine may include at least one processor and at least one non-transitory computer readable medium storing instructions which, when executed by the at least one processor, cause the one or more processors to embody circuitry including an input circuitry configured to receive machine operation data including a first data channel indicative of a sensed condition at a first location on the machine, the machine operation data corresponding to one or more work cycles of the machine and a data extraction circuitry for extracting at least a portion of the machine operation data, including data associated with the first data channel. The instructions may further cause the one or more processors to embody circuitry including an event identification circuitry for identifying one or more types of events involving an environment in which the machine operates and that occurred during the one or more work cycles of the machine by classifying the extracted machine operation data, a condition estimation circuitry for estimating a condition at a second location on the machine during the one or more work cycles of the machine based on the identified one or more types of events, and an event logging circuitry for logging the identified one or more types of events with a plurality of additional identified types of events to represent a plurality of work cycles during operation of the machine over time.

In yet another aspect, a method for monitoring an operation of a machine may include receiving machine operation data corresponding to one or more work cycles of the machine, identifying one or more events in the machine operation data that occurred during the one or more work cycles of the machine and involved an environment of the machine, and classifying the identified one or more events with a type of event via a trained machine learning model. The method may further include determining an amount of damage at a location of the machine during the one or more work cycles of the machine based on the type of event, wherein no sensor is present at the location, and monitoring the operation of the machine over time by storing the type of event and a plurality of additional types of events in one or more databases.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5A is a series of charts illustrating exemplary data channels useful for identifying and characterizing an event, according to aspects of the present disclosure.

FIG. 5B is a chart illustrating time-series data useful for identifying one or more types of events and exemplary identified events.

FIG. 6 is a chart illustrating validation simulations associated an exemplary machine learning model, according to aspects of the present disclosure.

FIG. 7 is a chart illustrating performance of exemplary machine learning algorithms, according to aspects of the present disclosure.

FIG. 8 is a table illustrating exemplary work data, according to aspects of the present disclosure.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
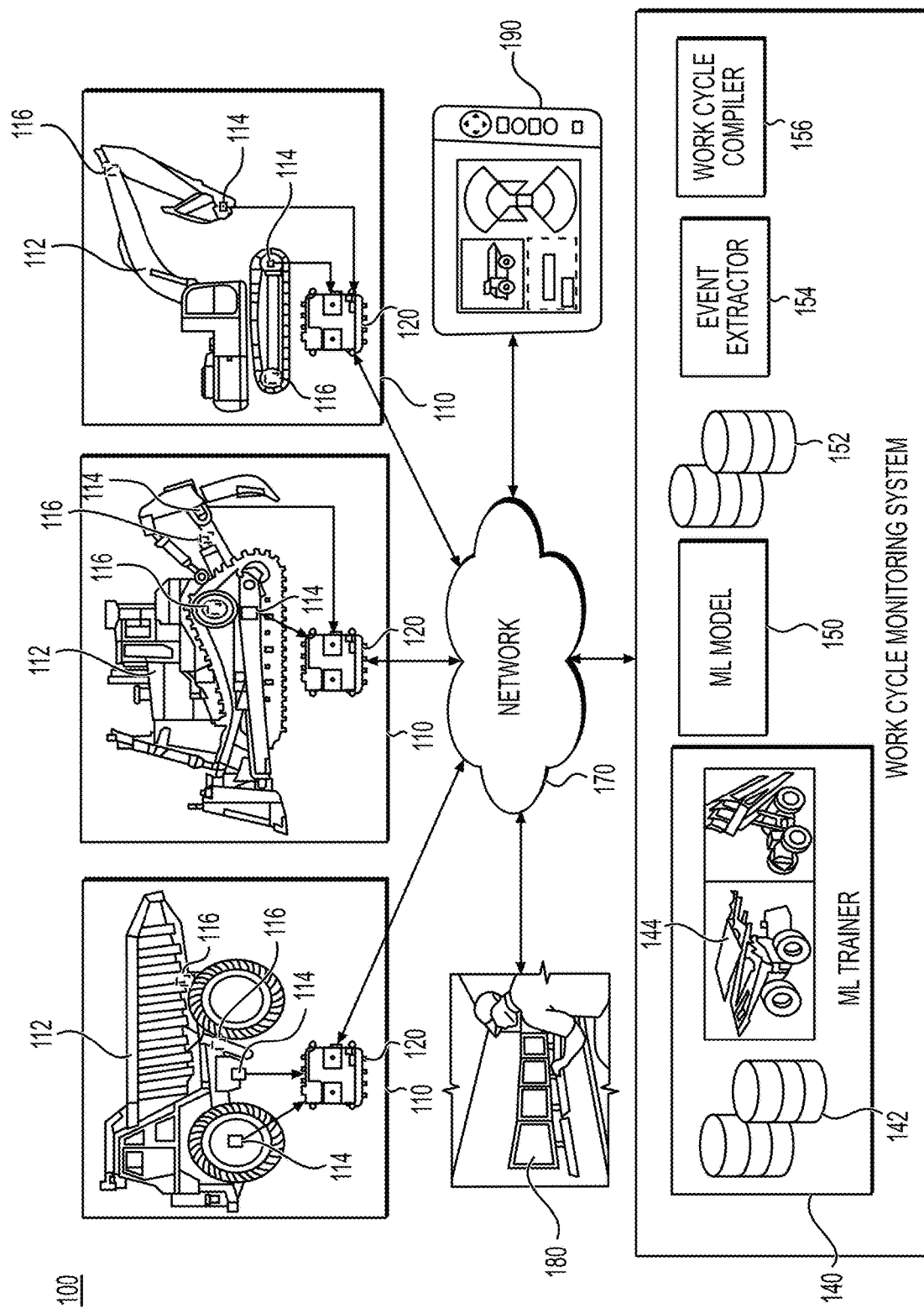
FIG. 1 is a diagram illustrating a system environment for including a work cycle monitoring system according to aspects of the present disclosure.

FIG. 1 is a diagram illustrating a system environment 100 including a work cycle monitoring system 130 that may be useful for monitoring work cycles and damage in one or more machines 112. System environment 100 may include one or more machine systems 110 and respective machines 112, a network 170, and work cycle monitoring system 130. System environment 100 may further include one or more supervision systems 180 and one or more machine displays or user displays 190. Machines 112 may be any mobile or stationary machine for performing tasks relevant to boring, earthmoving, hauling, material handling, forestry, power generation, or other applications. Exemplary machines 112 may include trucks, dozers, excavators, pavers, loaders, draglines, drills, graders, generators, or any other suitable machine. Monitoring system 130 may monitor machines 112 for damage that occurs to one or more machine systems (e.g., hydraulic systems, implement systems, drivetrain systems, frames, suspension systems, ground-traversing systems, power generation or storage systems, etc.), or components thereof.

Each machine 112 may be part of a machine system 110 that also includes an on-board system 120 which may be secured to machine 112, and one or more sensors secured at sensor locations 114, exemplary first locations, of machine 112. Each machine 112 may include an internal combustion engine (not shown) that is controlled by one or more electronic control modules (ECMs). In some aspects, an on-board system 120 may be configured to monitor the operation of the machine 112, including an operation of the machine 112, including travel speeds, positions, inclinations, and/or accelerations, among others. Additionally, on-board system 120 may be configured to monitor conditions of the internal combustion engine, hydraulic systems, implement systems, drivetrain systems, frames, and/or suspension systems, among others. To facilitate this monitoring of machine 112, sensor locations 114 may include strain sensors, accelerometers, pressure sensors (e.g., positioned to measure hydraulic pressure for controlling one or more implements or suspension components), etc. If desired, one or more location systems (e.g., GPS-based systems, radar-based proximity awareness systems, or others) may be employed by machine system 110. Each of these sensors and/or systems may be monitored by on-board system 120.

On-board system 120 may be implemented within an ECM of machine system 110 or instead as one or more stand-alone systems. On-board system 120 may include appropriate circuitry (e.g., signal processing circuitry for receiving, analyzing, and transmitting data according to signals generated by sensors at locations 114), and a network or communication interface for communicating with one or more external (e.g., off-board) systems via network 170. For example, on-board system 120 may include network interface circuitry for communicating with work cycle monitoring system 130, supervision system 180, and machine or user displays 190.

Work cycle monitoring system 130 may be configured to monitor a plurality of work cycles of at least one machine 112, and preferably a plurality of similar or identical machines 112, or, if desired, a plurality of different types of machines 112. Monitoring system 130 may include one or more components or systems configured to identify events that occur during the operation of machine 112 and classify or map these events to one or more predetermined types of events, as described in detail below, including appropriate circuitry for accomplishing each function described herein. In an exemplary configuration, monitoring system 130 may include a machine learning ("ML") trainer 140 configured to create, modify, and use datasets for training a machine learning model 150. ML trainer 140 may include one or more trainer databases ("DB") 142 storing training data, and a multi-body dynamics simulation 144 that represents a particular machine 112. Multi-body dynamics simulation 144 may include one or more physics-based simulation models configured to generate simulated transient data associated with predetermined events that may be experienced by machine 112, as described below. Simulated data generated by multi-body dynamics simulation 144 may be stored in trainer DB 142, for example.

Monitoring system 130 may also include one or more ML DBs 152 configured to store information output from ML model 150. For example, ML DBs 152 may include one or more datasets corresponding to events identified with ML model 150, and respective instantaneous and/or accumulated damages (e.g., based on one or more calculated amounts of strain) corresponding to locations of machine 112. For example, each instantaneous and/or accumulated damage may correspond to a sensor location 114 of machine 112 (e.g., a location on which a strain sensor or other type of sensor is located), or to a sensor-free location 116. Sensor-free locations 116 may correspond to exemplary second locations where no sensor is located. These second locations 116 may be distinct from the above-described first locations 114 of machine 112. An event extractor 154 may be configured to monitor machine operation data from sensors and an ECM associated with machine 112 and identify one or more events that occurred during operation of machine 112. A work cycle compiler 156 may be configured to monitor a status of machine 112 according to damage that accumulates over time according to estimates output by ML model 150. Work cycle compiler 156 may be configured to generate notifications associated with work cycle composites, machine maintenance, operator training, damage aggregation, and/or damage validation, as described below.

Monitoring system 130 may be configured to communicate with one or more supervision systems 180 for monitoring machine 112 or a fleet (plurality) of machines 112. Supervision systems 180 may be configured to display a status (e.g., identified events, an accumulated damage, remaining life, need for maintenance or repair, etc.) to one or more users, such as fleet managers or maintenance personnel. Additionally, monitoring system 130 may be configured to cause one or more machine or user displays 190 to display a status or notification. Machine or user displays 190 may correspond to a user device associated with a user (e.g., an operator of machine 112, maintenance personnel, etc.), including a mobile system (smart phone, laptop) or other computer system. Additionally or alternatively, display 190 may correspond to a display of machine 190. One or both of supervision system 180 and display 190 may display a suitable notification that provides information regarding one or more damaged components or systems of machine 112, a need to perform maintenance on machine 112, or any other suitable notifications.

While work cycle monitoring system 130 is illustrated as being an off-board (e.g., remote) system that communicates with on-board system 120, in at least some configurations of system environment 100, one or more components of monitoring system 130 (e.g., ML model 150, event extractor 154, and work cycle compiler 156), may be provided as on-board components of machine 112. These components of monitoring system 130 may, for example, be implemented by on-board system 120, or a separate on-board system. If desired, ML trainer 140 and/or ML DB 152 may also be implemented in machine 112 as on-board components.

Figure 2:
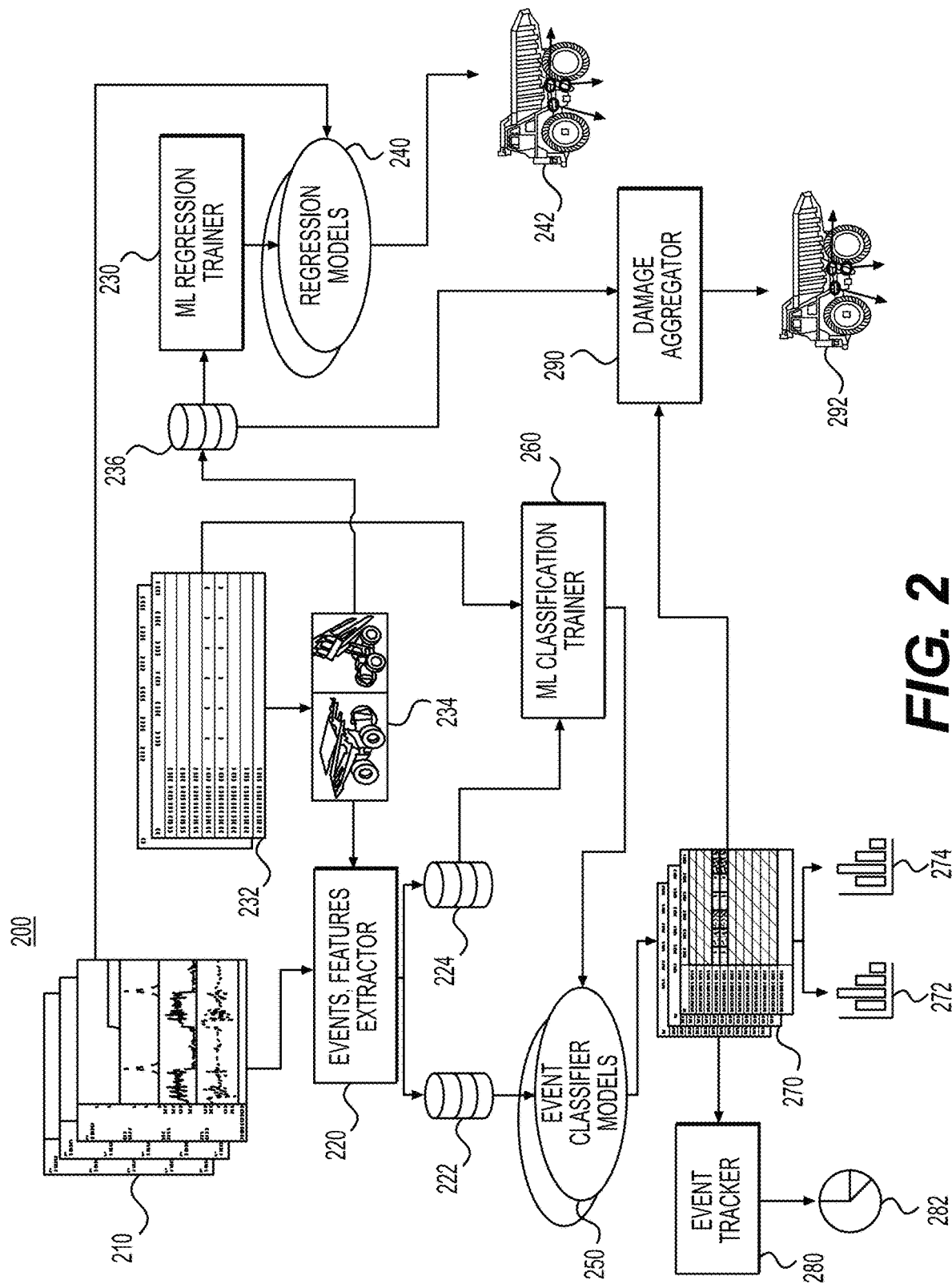
FIG. 2 is diagram of a system environment for event classification, event tracking, and/or damage tracking, according to aspects of the present disclosure.

FIG. 2 illustrates an exemplary system environment 200 for monitoring an operation of one or a plurality of machines 112 with use of a ML model (e.g., ML model 150 of FIG. 1), and for providing outputs, such as notifications, for supervision system 180 and machine or user display 190. Machine data 210 may be an input received by monitoring system 130 via network 170 in a plurality of channels (four channels shown in FIG. 2), including a first data channel corresponding to a sensor location 114. This first data channel may be indicative of a condition sensed by a strain sensor or any other sensor described herein. Additionally or alternatively, the first data channel, or any other data channel of machine data 210, may be indicative of information received from the ECM (e.g., engine speed, fuel rate, operating temperatures, or others). Machine data 210 may be received in real-time or near real-time. However, if desired, machine data 210 may be received after a period of time, and/or may be received intermittently (e.g., daily, weekly, monthly, etc., depending on the availability of network 170, available bandwidth, and/or availability of processing capacity).

One or more algorithms may be employed by monitoring system 130 to identify the occurrence of an event, and extract the corresponding machine data 210 before the type of event is identified. For example, an events, features extractor 220 ("EF extractor" 220), which may correspond to event extractor 154, may identify the occurrence of events reflected in machine data 210 and may extract data 210 containing these events and one or more features (e.g., event signatures reflected in one data channels corresponding to a particular sensor and/or condition output from an ECM, such as machine speed, payload, strut pressures, etc.) for analysis by one or more ML models 150 (e.g., event classifier models 250 and regression models 240). This extraction may be performed, for example, based on events simulated by multi-body dynamics simulation 234, by searching for event signatures in machine data 210 that match simulated event signatures, without performing an identification of the type of event reflected in data 210. These event signatures may be present in sensed data, data received from an ECM, or both. Event signatures may correspond to, for example, sensed pressures (e.g., pressures on struts, shocks, springs, wheels, axles, body, frame), lateral accelerations and/or velocities, forward or reverse accelerations and/or velocities, etc., that exceed a predetermined threshold or match an expected waveform (e.g., a reverse acceleration that transitions to forward motion or a stop over a predetermined period of time).

A database or matrix of predetermined events 232 may store data corresponding to various types of events that machine 112 may be expected to experience, and may be provided to multi-body dynamics simulation 234 for simulation of these events. These simulations may be useful for determining forces, wear, and/or damages at various locations of machine 112 during each event. Data contained in events matrix 232 may also be provided to an ML classification trainer 260, as shown in FIG. 2. In particular, event labels, examples of which are described below and shown in FIG. 4, may be output to ML classification trainer 260 from events matrix 232.

Multi-body dynamics simulation 234 may correspond to multi-body dynamics simulation 144, described above with respect to FIG. 1, and may include a plurality of simulated structural bodies of machine 112 that, when subjected to simulated transient events, produce outputs in the form of dynamic structural responses. Events simulated in multi-body dynamics simulation 234 may be associated with one or more predetermined types of events specified by events matrix 232. Exemplary structural responses may include strains, reactionary forces, such as bearing loads on pins or bearings, stresses, etc., at multiple locations of the simulated machine 112. Multi-body dynamics simulation 234 may include structural responses of the machine through the use of flexible bodies, such as flexible bodies that represent one or more components of the frame of machine 112. These responses may change over time, for example, when simulating an encounter with a pothole, responses while entering the pothole will differ from responses while striking the bottom the pothole and exiting the pothole. Exemplary simulated locations or members of machine 112 may include a series of members that form a frame of machine 112. In the example of a truck, multi-body dynamics simulation 234 may simulate a dump body, systems for raising and lowering the dump body, and suspension components of the machine 112, including members, hinges, linkages, and/or struts. The simulated data produced by multi-body dynamics simulation 234, in particular, damage that occurred at various locations during the simulated event, may be output to a simulated structural responses DB 236 for use with ML regression trainer 230. These simulated structural responses may also be provided as an output to EF extractor 220.

EF extractor 220 may output detected or actual events to a corresponding database, referred to herein as actual events, features DB 222 ("actual EF DB" 222). Actual EF DB 222 may be used to store one or more datasets that includes each extracted field event (e.g., actual events contained in machine data 210 and extracted by EF extractor 220), as well as corresponding features associated with each channel of data. EF extractor 220 may be further configured to extract simulated events and features from simulations performed with multi-body dynamics simulation 234. These simulated events and features (e.g., simulated data channels) may be stored as one or more datasets in simulated events, features database 224 ("simulated EF DB" 224).

One or more event classifier models 250 may be configured to classify one or more extracted events based on information received from actual events, features DB 222 and training performed with ML classification trainer 260. In at least some configurations, a plurality of event classifier models 250 may be employed, each of these models 250 being trained to classify a particular type of event. In the example of a mining operation, types of events may include dumping, loading, potholes, ditches, turning, and any other event described herein or suitable for monitoring one of the machines described herein. ML classification trainer 260 may be configured to receive simulated data from simulated EF DB 224 and labels from predetermined events matrix 232. Thus, ML classification trainer 260 may employ simulated data (e.g., data from simulated EF DB 224) for ground truth labels, and event signatures as features.

Event classifier models 250 may be configured to output classified or identified events to events frequency DB 270, which may store datasets that represent a number of occurrences of each type of event and damage incurred during the event at a plurality of locations such as locations 114 and 116 (FIG. 1). This data may be output to event tracker 280 which may log a plurality of events in a composite work cycles database 282 to monitor how many times particular events occurred and how often these events occurred for a plurality of machines 112. Additionally, events frequency DB 270 may be configured to output identified types of events and, if desired, corresponding damages at one or more locations of machine 112, to a coaching notification generator 272 which may be configured to generate training notifications to one or both of supervision system 180 and machine/user display 190. Additionally or alternatively, events frequency DB 270 may include datasets provided to maintenance notification generator 274 which may be configured to generate maintenance notifications to one or both of supervision system 180 and machine/user display 190. Notifications that may be output by coaching and maintenance notification generators 272, 274 are described below.

Regression models 240 may include one or more models configured to perform regression analyses on received machine data 210. To facilitate regression analysis, ML regression trainer 230 may provide regression training data based on simulated structural responses stored in DB 236. Each model of the regression models 240 may be employed to perform regression analysis based on machine data 210 and simulated structural response training data to estimate damage at a plurality of locations of machine 112, including locations 114 and 116. Estimated damage may be output to a remaining life tracker 242 configured to monitor damage and predict a structural health of components of a frame of machine 112, implements of machine 112, and others.

Damage aggregator 290 may receive an output from events frequency DB 270. Aggregator 290 may also be configured to receive one or more datasets stored in simulated structural responses DB 236 in order to monitor an amount of damage that accumulated over time in various locations (e.g., locations 114, 116) of machine 112. A damage validator 292 may be configured to compare aggregated damage data collected by damage aggregator 290 to historical (validation) data and thereby evaluate an accuracy of the event classification and multi-body dynamics simulation performed by event classifier models 250 and multi-body dynamics simulation 234.

Figure 3:
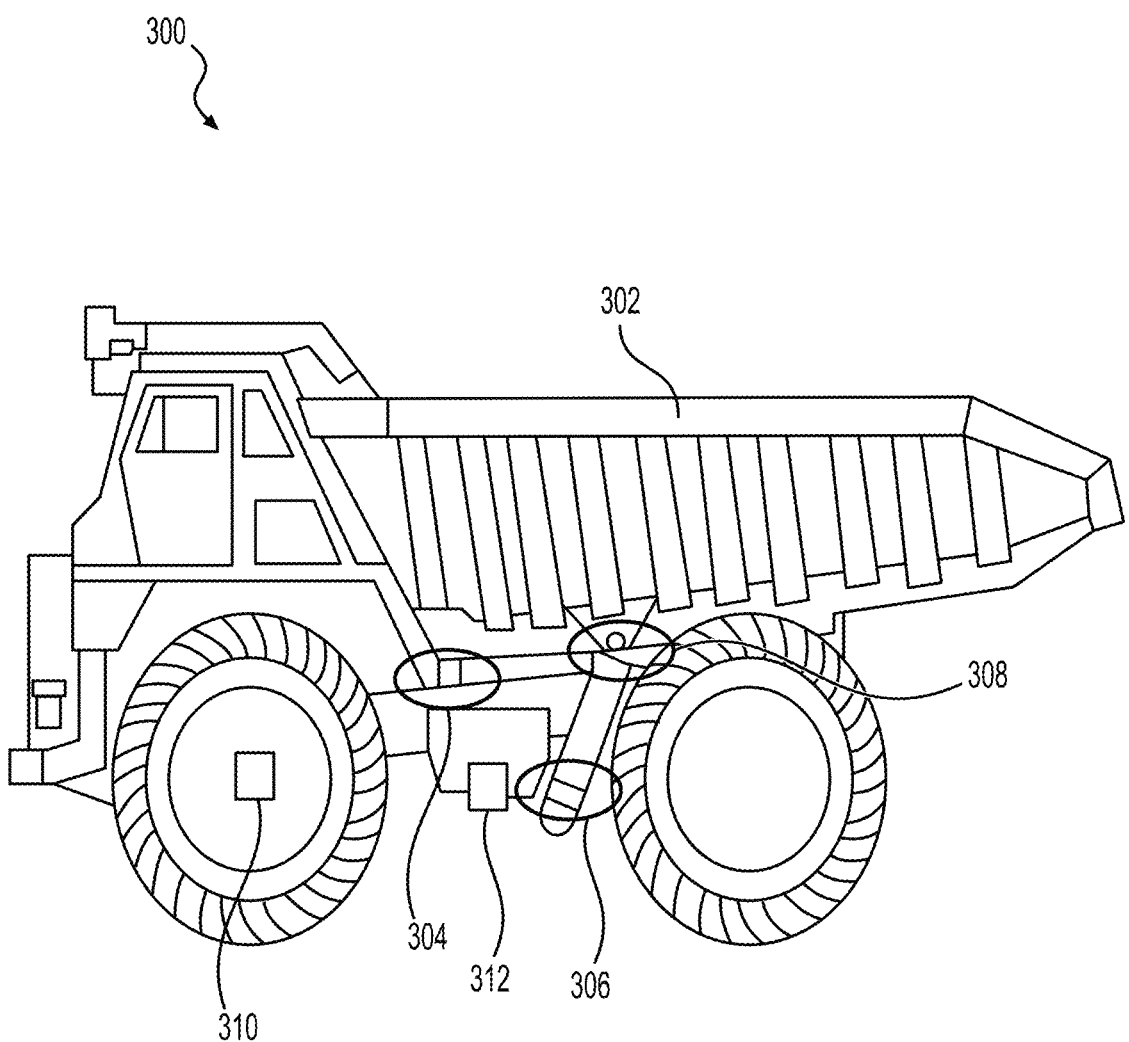
FIG. 3 is an illustration of damage estimation and/or remaining life tracking for one or more locations of a machine, according to aspects of the present disclosure.

FIG. 3 illustrates a remaining life tracker 300 that may correspond to remaining life tracker 242. Remaining life tracker 300 may be configured to log and monitor strains, or other damage-causing conditions, at various locations of machine 112 and provide notifications to one or both of supervision system 180 and machine or user display 190.

As represented by machine model 302 of FIG. 3, damage may be tracked at a plurality of locations that represent locations on an actual machine 112. Exemplary tracked damages may include a first cumulative damage 304, second cumulative damage 306, and third cumulative damage 308, each of which may represent a sensor-free location 116. A fourth exemplary damage 310 and fifth exemplary damage 312 may correspond to cumulative damages at sensor locations 114 of machine 112. In some aspects, damages at one or more locations may be tracked based on a remaining useful life (e.g., which gradually decreases over time), or based on an accumulated damage (e.g., which gradually increases over time). In this disclosure, the term "damage" is understood to include either (or both) of these representations. In a simplified example, a first cumulative damage 304 may correspond to 50% at a particular time, while cumulative damages 306, 308 may respectively correspond to 30% and 60%. Accordingly, each damage (e.g., damages 304-312, and others) are individually monitored and may be presented to a user of system 180 and/or display 190. In at least some configurations, remaining life tracker 300 may be configured to indicate a need to perform maintenance at one or more locations of machine 112, such as one or more of exemplary locations 304, 306, 308, 310, or 312. When so configured, FIG. 3 may represent a maintenance notification displayed on system 180 or display 190 via generator 274.

Figure 4:
FIG. 4 is a table illustrating exemplary simulation event data, according to aspects of the present disclosure.

FIG. 4 illustrates an exemplary event data 400 that may correspond to events matrix 232, which may be output to multi-body dynamics simulation 234 for the acquisition of simulation data. Event data 400 may include data for various types of events that machine 112 may experience. Each of these types of events may have been simulated by multi-body dynamics simulation 234. Exemplary types of events that are stored in event data 400 may include rack events (e.g., strain introduced on frame components by encountering uneven terrain such as a pothole), bounce events, turning events, highwall (impact) events, braking events (e.g., braking force and/or deceleration greater than a predetermined threshold), and others. At least some of these events may involve one or more aspects of a work environment in which machine 112 may operate, such as a profile of the surface of terrain across which a truck may traverse (e.g., when traveling to or from a mine).

As illustrated in FIG. 4, a plurality of subtypes or classes may be simulated to generate data for a particular event. The events and classes may be focused on a particular application, such as a mining application. Taking the example of a rack event, as shown in FIG. 4, subtypes or classes may include a pothole size (e.g., sharp or gradual), depth (e.g., 100 mm, 200 mm, etc.), a side of the machine (e.g., left or right) that encountered the pothole (see left column), and a traveling speed at which the pothole was encountered (see upper row). The simulation may determine strain and/or damage at various locations of machine 112, as described above. The occurrence rate of a particular event for an exemplary machine 112 is represented by a box in FIG. 4, with larger boxes representing increased number of occurrences of those events.

FIG. 5A includes a series of charts illustrating exemplary simulated data channels 500 that may be generated with multi-body dynamics simulation 144, 234, and used to characterize machine operation data. As shown, simulated data may be associated with a plurality of features, three of which are illustrated in FIG. 5A. These features may allow classifier models 250 to identify one or more types of events. In the illustrated example, simulated data channels 500 may be relevant to types of events associated with a stopping event (e.g., stopping after traveling in reverse). Subtypes or classes of events related to a stopping event may include striking an obstruction (e.g., an elevated wall) on the left of the machine, striking an obstruction on the right of the machine, striking an obstruction on the center or other portion of the machine, or performing braking without striking an obstruction, each of these events performed during or immediately following traveling in reverse.

In the exemplary charts of FIG. 5A, an x-axis of charts 510, 512, and 514 may correspond to a first feature, (feature 1), an x-axis of charts 520, 522, and 524 may correspond to a second feature, (feature 2), and an x-axis of charts 530, 532, and 534 may correspond to a third feature (feature 3). As can be seen in FIG. 5A, a y-axis of charts 510, 520, and 530 may correspond to feature 1, a y-axis of charts 512, 522, and 532 may correspond to feature 2, and a y-axis of charts 514, 524, 534 may correspond to feature 3. Feature 1 may represent a pitch of machine 112 (e.g., by pressure sensed at struts of a suspension system), feature 2 may represent strain gauge information at one or more locations on a frame of machine 112, and feature 3 may correspond to a speed at a detected impact.

Simulated data channels 500, as represented by the exemplary charts 510-534, may be employed to train one or more event classifier models 250 to identify a particular event, such as a stopping event. Characterization, or mapping, of the machine operation data to simulated data, such as simulated data channels 500, may be performed by any suitable machine learning model algorithm (implemented as one or more event classifier models 250), such as a support vector machine model, a k-nearest neighbor model, random forest machine model, or others. Once an event type is identified, if desired, a more specific characterization or mapping may be performed by identifying a multi-body dynamics simulation (e.g., signatures present in simulated data channels 500) that most closely resembles one or more event signatures in the machine operation data. With reference to chart 520, groups of simulated data corresponding to four subtypes, or classes, of events are circled, with the left circled group representing a class ("class A") of simulations of striking an obstruction on the left of the machine. The right circled group may represent a class ("class B") representing striking an obstruction on the right of the machine. An upper-central circled group may represent reverse braking without striking an obstruction ("class C"). Finally, a central circled group (which may include data points extending within the upper-central group, these data points are not circled for clarity) may correspond to striking an obstruction at approximately a center of the machine 112 ("class D"). Each of the remaining charts 510-534 may have similar groupings and may be used in conjunction to identify the particular type of event, and, if desired, a particular class or subtype of event.

FIG. 5B illustrates time-series data 550 corresponding to an actual operation of machine 112. Time-series data 550 may form an exemplary data channel of machine operation data (e.g., machine data 210). In FIG. 5B, the horizontal axis represents time and the vertical axis represents travel speed of machine 112. In this example, classifier model 250 may identify events 552, 554, 556, 558, 560, and 562, and classify one or more events as a stopping-type event, and, in particular, a reverse-stopping event. By comparing one or more channels of machine operation data, which may include data 550, to simulated data, a class or subtype of the event may also be identified. This identification of a class or event subtype may be performed, in at least some embodiments, without the use of a machine learning model, if desired. In the exemplary time-series data 550, stopping events 552, 560, and 562 may be class A events, stopping event 558 may be a class B event, stopping event 554 may be a class C event, and event 556 may be a class D event.

FIGS. 6 and 7 illustrate ML assessment data 600 for validation of exemplary ML models, such as regression models 240. Referring to FIG. 6, ML assessment data 600 may represent an exemplary implementation of damage validator 292. In data 600 each circle represents a simulated event. Each simulated event may be associated with a particular surface characteristic (with different surface characteristics being represented by the y-axis) and speeds (with different speeds being represented by the x-axis), similar to event data 400 described above with respect to FIG. 4. Validation data, represented by crosses, may represent a test performed on a test machine 112 equipped with sensors, including strain sensors. Each point of training data and each point of validation data may be associated with a respective amount of damage calculated for a particular location of machine 112, e.g., by regression models 240.

The estimated damage calculated for one or more points (circle or cross) of ML assessment data 600 may be calculated and compared to actual damage measured by a strain gauge. The difference between these two values represents the accuracy with which events are identified and damage is estimated by system 130. In FIG. 6, training data 602, represented by solid circles, and validation data 612, represented by solid crosses, correspond to zero or negligible amounts of error. In these cases, the amount of damage predicted by monitoring system 130 introduced little or nearly no error, when used to identify events on training (simulation) data, or validation (test) data. Training data 604 and validation data 614, represented by circles and crosses with dashed lines, represent small amounts of error. Finally, the single encircled simulation of validation represents an exemplary outlier data 616. As can be seen in FIG. 6, system 130 is configured to accurately assess damage when simulation data is employed to train one or more ML models 150 (e.g., regression models 240 and/or event classifier models 250).

FIG. 7 includes a series of plots illustrating ML training and validation data 700 that is illustrative of the performance of ML algorithms which may be employed ML models 150. In FIG. 7, each plot may represent a particular location that is associated with three different channels (e.g., three sensors on a particular of location 114 configured to measure strains at this location). A solid line of each plot represents actual (sensed) damage or strain, while the dashed line represents an amount of strain predicted by the regression model 240 by use of the indicated ML algorithm. As can be seen in FIG. 7, five exemplary ML regression algorithms useful for ML models (e.g., regression models 240) may include MLR (multiple linear regression), random forest, as well as neural networks such as multilayer perceptron (MLP) neural networks or recurrent neural networks (RNN). As can be seen, neural networks employing an MLP may employ any suitable number of iterations (e.g., 200 iterations, 500 iterations, etc.). In particular, an NN MLP employing 500 iterations may advantageously reduce processing requirements while accurately predicting damage.

FIG. 8 is a table illustrating exemplary work cycle data 800 that may be logged by system 130 and output by events frequency DB 270 to one or more of event tracker 280, coaching notification generator 272, or maintenance notification generator 274. In some configurations, work cycle data 800 may be logged in composite work cycles DB 282. Work cycle data 800 may include data representative of a plurality of types of events 810, such as dumping, loading, potholes, ditches, or turning, as illustrated in FIG. 8. Any other suitable types of events, including any events described herein (e.g., reverse-stopping events) may be included as a type of event 810. A composite value 820 may represent an overall frequency of the corresponding type of event 810. Composite value 820 may correspond to, for example, an overall number of times each respective event is expected to occur over time (e.g., a number of occurrences per hour of operation, a number of occurrences per month, a number of occurrences per miles traveled, etc.). Each segment 830, 832, and 834 may correspond to a simulated amount of occurrences at a respective site (e.g., a particular mine location), or a particular portion or path of the same site.

Figure 9:
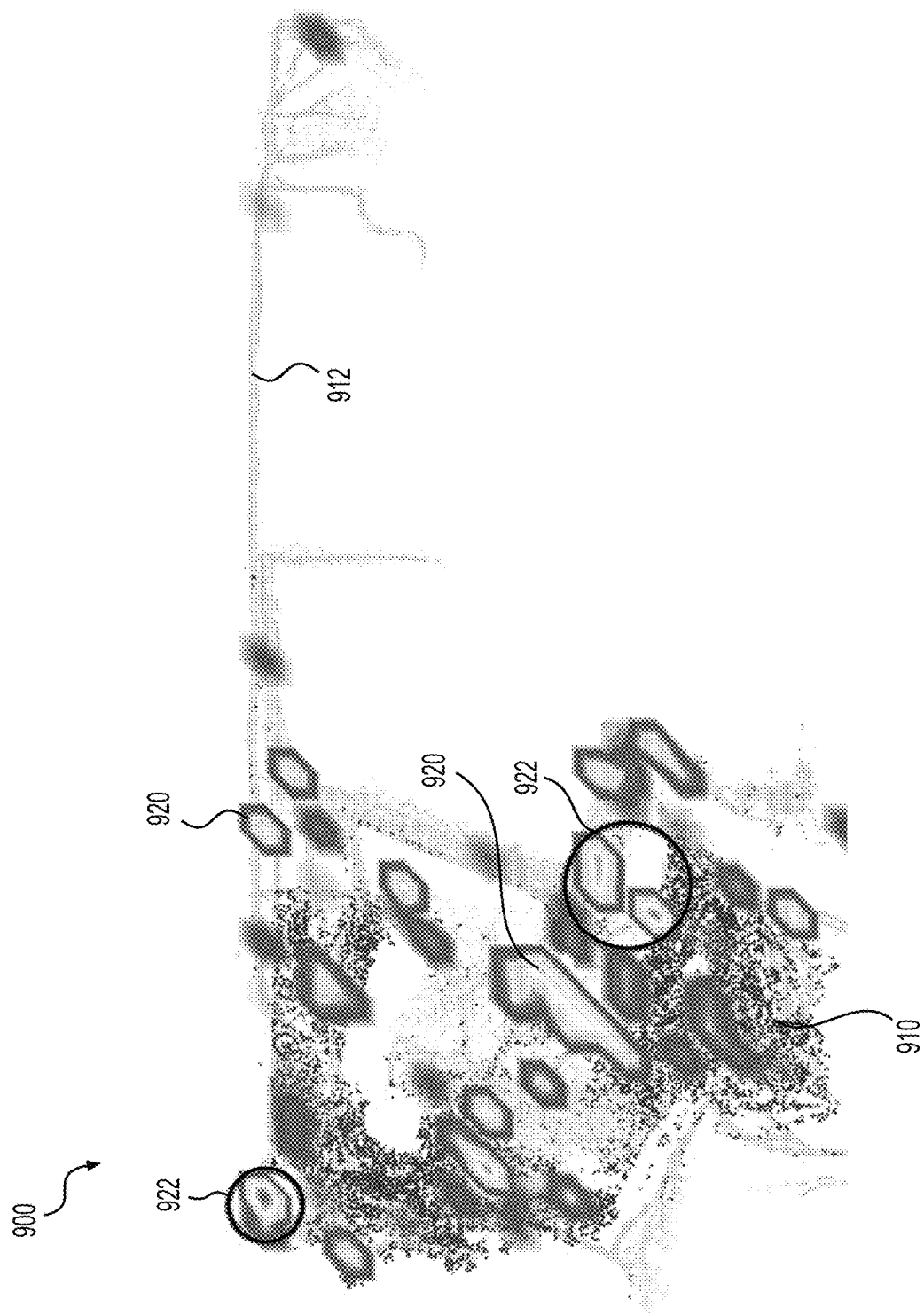
FIG. 9 is a heatmap illustrating exemplary operator coaching and/or maintenance data, according to aspects of the present disclosure.

FIG. 9 illustrates an exemplary heatmap 900 representative of a worksite (e.g., a mining worksite) on which one or more machines 112 are operated. Heatmap 900 may be presented on a display on supervision system 180, machine or user display 190, or both, and may correspond to an example of a notification issued by coaching notification generator 272. In FIG. 9, an exemplary loading location 910 may represent positions at which machines 112, such as trucks, are loaded with material. One or more dark-colored dots in FIG. 9 may represent an exemplary loading location. These machines 112 may travel along machine paths 912, such as haul roads, to one or more destination locations (light colored dots in FIG. 9) where the material is deposited, transferred, etc., in a plurality of work cycles that are monitored by work cycle monitoring system 130.

By monitoring the operation of one or more machines 112, work cycle monitoring system 130 may identify one or more locations 920, 922 where damage occurred by identifying events, determining which type(s) of events occurred, and estimating an amount of damage at one or more locations of machine 112 based on the identified type(s) of events. A geographic location at which each identified event occurred may be determined based on a location system (e.g., a GPS-based system) of machine system 110. As shown in FIG. 9, one or more locations 920 may be associated with a moderate amount of damage. This amount of damage may correspond to a number of damaging events at a particular location over a period of time, an average or expected damage per event at this location, or both. One or more locations, such as encircled locations 922, may represent locations at which significant damage may occur, due to a large number of damaging events, a large amount of damage incurred per event, or both.

Figure 10:
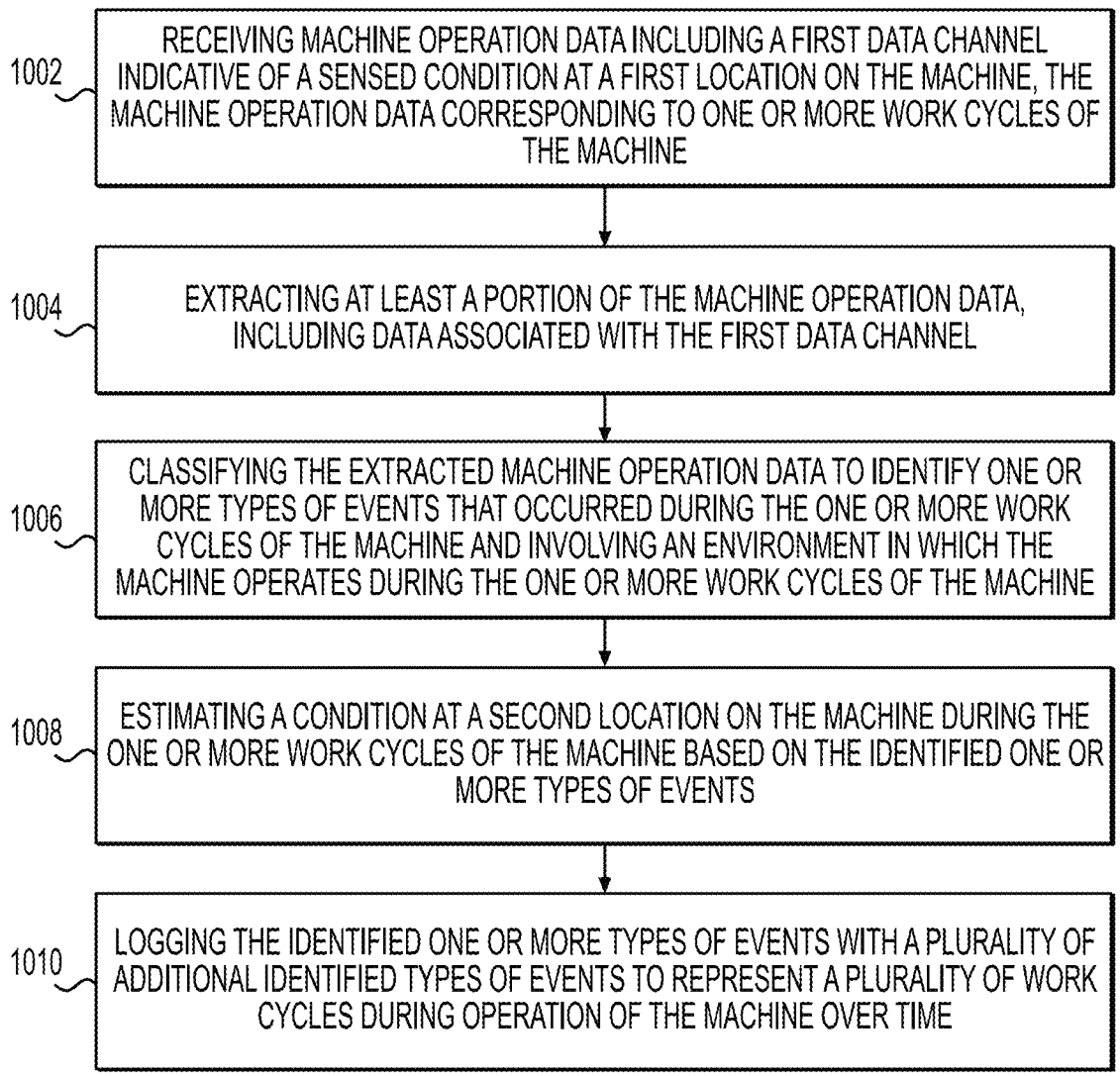
FIG. 10 is a flowchart illustrating an exemplary process, according to aspects of the present disclosure.

FIG. 10 is a flowchart illustrating an exemplary process 1000 that may be performed for monitoring operation and/or the occurrence of damaging events in one or more machines 112. Step 1002 of process 1000 may include receiving machine operation data including a first data channel (e.g., machine data 210) indicative of a sensed condition at a first location of machine 112. This machine operation data may include or correspond to one or more work cycles of machine 112. For example, machine data 210 may include one or more work cycles that include potentially damaging events. Machine operation data may capture the performance or condition of a component of machine 112 such as a strut, frame component, engine condition, etc., during the potentially damaging event.

Step 1004 may include extracting some or all of the machine operation data, as described above with respect to EF extractor 220, for example. Data extracted from machine data 210, for example, may include data associated with the first data channel, such as data measured by one or more sensors at a location 114.

Step 1006 may include classifying the above-described machine operation data. Classifying may be performed by one or more event classifier models 250, as described above, to identify one or more types of events that occurred during one or more work cycles of machine 112. The one or more types of events may correspond to any of the events described herein and may involve an environment in which the machine operates. For example, the environment may include a pothole, incline, decline, wall (e.g., highwall), ditch, turn, dumping action or location, loading action or location, or any other suitable environment or environmental feature. In at least some embodiments, the environment may be a mining environment. Machine 112 may operate in the environment for one or more work cycles and may interact with the environment repeatedly during these work cycles as described with respect to FIG. 9, for example.

Step 1008 may include estimating a condition at a second location such as a sensor-free location 114 of machine 112. This estimation may be performed by event classifier models 250 and/or regression models 240, and may be based on the identified type of event.

Step 1010 may include logging the identified type of event with additional (e.g., previously identified) types of events to represent work cycles of machine 112 over time. Additionally or alternatively, the type of event may be logged via remaining life tracker 242 and/or damage validator 292. Step 1010 may include storing this information in composite work cycles DB 282, and/or providing outputs such as a coaching notifications via coaching generator 272, maintenance notifications via notification generator 274, or both. Logging performed in step 1010 may facilitate the consolidation and/or storage of data for remaining life tracker 300, work cycle data 800, heatmap 900, and/or notifications presented by supervision system 180 and/or machine or user display 190.

Figure 11:
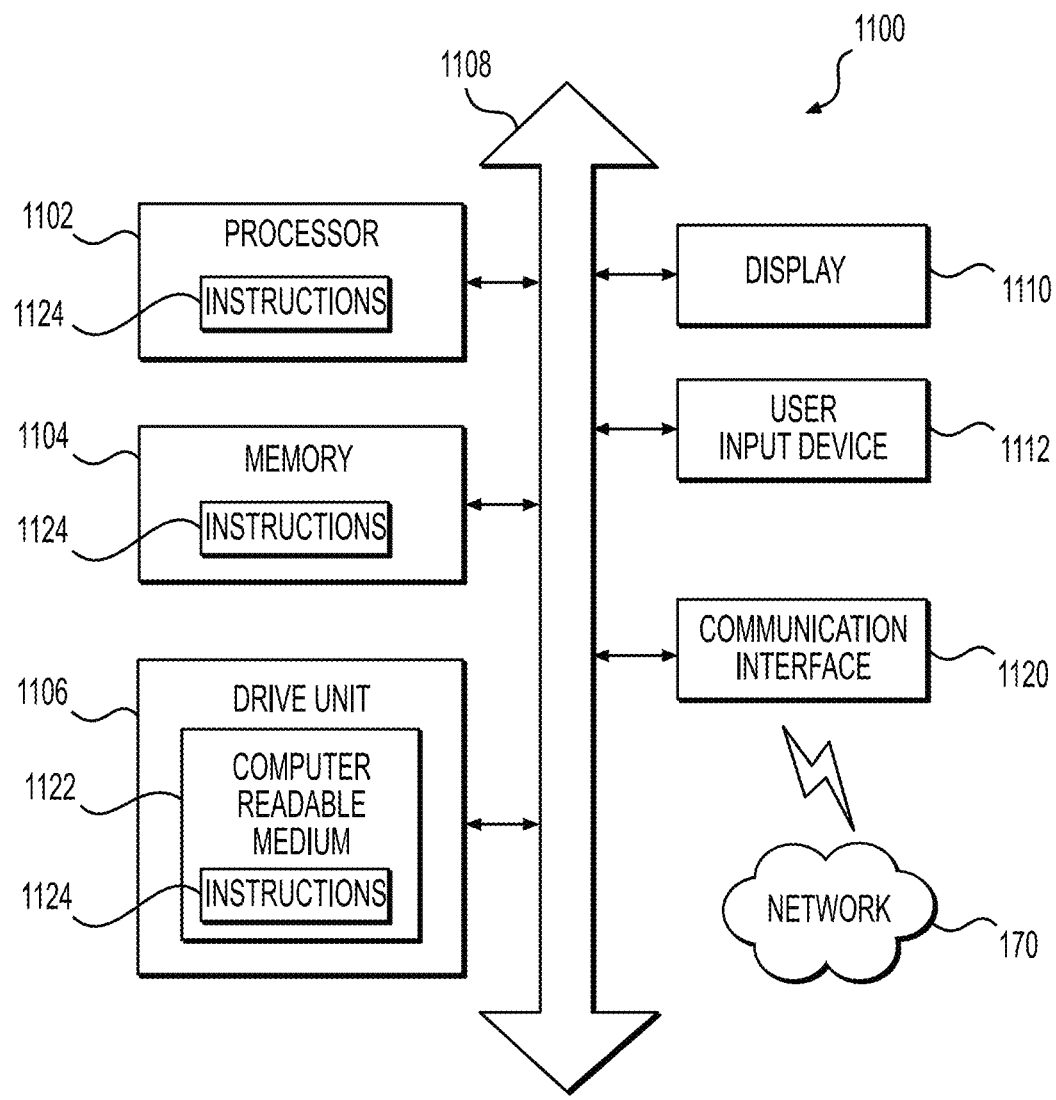
FIG. 11 is a block diagram illustrating an implementation of a computer system that may execute techniques, according to aspects of the present disclosure.

FIG. 11 illustrates an implementation of a computer system 1100, which may correspond to onboard-system 120, work cycle monitoring system 130, supervision system 180, machine and/or user display 190, as well as other device(s) useful in system environment 100 or 200. Computer system 1100 may include a set of instructions that can be executed to cause computer system 1100 to perform any one or more of the methods or computer based functions disclosed herein. Computer system 1100 may operate as a standalone device or may be connected, e.g., using a network, to other computer systems or peripheral devices.

In a networked deployment, computer system 1100 may operate in the capacity of a server or as a client user computer in a server-client user network environment, or as a peer computer system in a peer-to-peer (or distributed) network environment. Computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, computer system 1100 may be implemented using electronic devices that provide voice, video, or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, computer system 1100 may include a processor 1102, e.g., a central processing unit (CPU), a graphics processing unit (GPU), or both. Processor 1102 may be a component in a variety of systems. For example, processor 1102 may be part of a standard personal computer or a workstation. Processor 1102 may be one or more general processors, digital signal processors, application specific integrated circuits, field programmable gate arrays, servers, networks, digital circuits, analog circuits, combinations thereof, or other now known or later developed devices for analyzing and processing data. Processor 1102 may implement a software program, such as code generated manually (i.e., programmed).

Computer system 1100 may include a memory 1104 that can communicate via a bus 1108. Memory 1104 may be a main memory, a static memory, or a dynamic memory. Memory 1104 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, memory 1104 includes a cache or random-access memory for processor 1102. In alternative implementations, memory 1104 is separate from processor 1102, such as a cache memory of a processor, the system memory, or other memory. Memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. Memory 1104 is operable to store instructions executable by processor 1102. The functions, acts or tasks illustrated in the figures or described herein may be performed by the programmed processor 1102 executing the instructions stored in memory 1104. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, computer system 1100 may further include a display 1110, such as a liquid crystal display (LCD), an organic light emitting diode (OLED), a flat panel display, a solid-state display, a cathode ray tube (CRT), a projector, a printer or other now known or later developed display device for outputting determined information. Display 1110 may act as an interface for a user, to see the functioning of processor 1102, or specifically as an interface with the software stored in memory 1104 or in drive unit 1106.

Additionally or alternatively, computer system 1100 may include an input device 1112 configured to allow a user to interact with any of the components of system 1100. Input device 1112 may be a number pad, a keyboard, or a cursor control device, such as a mouse, or a joystick, touch screen display, remote control, or any other device operative to interact with computer system 1100.

Computer system 1100 may also or alternatively include a disk or optical drive unit 1106. Disk drive unit 1106 may include a computer-readable medium 1122 in which one or more sets of instructions 1124, e.g. software, can be embedded. Further, instructions 1124 may embody one or more of the methods or logic as described herein. Instructions 1124 may reside completely or partially within memory 1104 and/or within processor 1102 during execution by computer system 1100. Memory 1104 and processor 1102 also may include computer-readable media as discussed above.

In some systems, a computer-readable medium 1122 includes instructions 1124 or receives and executes instructions 1124 responsive to a propagated signal so that a device connected to a network 170 can communicate voice, video, audio, images, or any other data over the network 170. Further, the instructions 1124 may be transmitted or received over the network 170 via a communication port or interface 1120, and/or using a bus 1108. The communication port or interface 1120 may be a part of processor 1102 or may be a separate component. Communication port 1120 may be created in software or may be a physical connection in hardware. Communication port 1120 may be configured to connect with a network 170, external media, display 1110, or any other components in computer system 1100, or combinations thereof. The connection with network 170 may be a physical connection, such as a wired Ethernet connection or may be established wirelessly as discussed below. Likewise, the additional connections with other components of computer system 1100 may be physical connections or may be established wirelessly. Network 170 may alternatively be directly connected to bus 1108.

While computer-readable medium 1122 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. Computer-readable medium 1122 is non-transitory, and may be tangible.

Computer-readable medium 1122 can include a solid-state memory such as a memory card or other package that houses one or more non-volatile read-only memories. Computer-readable medium 1122 can be a random-access memory or other volatile re-writable memory. Additionally or alternatively, computer-readable medium 1122 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Computer system 1100 may be connected to one or more networks 170. Network 170 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. Network 170 may include wide area networks (WAN), such as the Internet, local area networks (LAN), campus area networks, metropolitan area networks, a direct connection such as through a Universal Serial Bus (USB) port, or any other networks that may allow for data communication. The network 170 may be configured to couple one computing device to another computing device to enable communication of data between the devices. The network 170 may generally be enabled to employ any form of machine-readable media for communicating information from one device to another. Network 170 may include communication methods by which information may travel between computing devices. Network 170 may be divided into sub-networks. The sub-networks may allow access to all of the other components connected thereto or the sub-networks may restrict access between the components. Network 170 may be regarded as a public or private network connection and may include, for example, a virtual private network or an encryption or other security mechanism employed over the public Internet, or the like.

INDUSTRIAL APPLICABILITY

During operation of a machine 112, on-board system 120 may receive sensed data from sensors at one or more sensor locations 114 and provide machine operation data, include a data channel indicative of a condition at a sensor location 114 to monitoring system 130. On-board system 120 may further include machine operation data generated by an ECM. Such an ECM may be implemented within on-board system 120 or may be provided as a separate system in communication with on-board system 120. Work cycle monitoring system 130 may receive machine operation data, extract some or all of this machine operation data, and identify one or more types of events that occurred during work cycles of machine 112. This identification may be performed by use of one or more ML models, such as a plurality of ML classifier models 250 configured to identify a respective plurality of events. These ML models may be assisted by a multi-body dynamics simulation 234 of machine 112, which may increase the accuracy and usefulness of the ML models. Conditions, such as strain-induced damage, may be determined at one or more sensor-free locations 116 of machine 112, by use of a plurality of regression models that are provided for each of a plurality of predetermined types of events.

In at least some aspects, by providing a physics-based simulation and ML models, it is possible to classify identified events by comparison with simulated events. This may avoid the need to design machines based on work cycles that represent the 90th percentile of operations, potentially reducing the potential for overdesign. Additionally, the systems and methods herein allow for the use of transient data that includes information from sensors (e.g., strain sensors) and data from the ECM, which may improve event characterization. The use of simulation data, such as a multi-body dynamics model, provides a significantly larger amount of training data for a machine learning model (such as a support vector machine), than is possible from physical testing alone. The information provided by the methods and systems described herein may provide feedback to users including seasonal trends, operator feedback, and locations where damage tends to occur.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments may be practiced without these specific details. In other instances, well-known methods, structures and techniques have not been shown in detail in order not to obscure an understanding of this disclosure.

Thus, while there has been described what are believed to be the preferred embodiments, those skilled in the art will recognize that other and further modifications may be made thereto without departing from the spirit of the disclosure, and it is intended to claim all such changes and modifications as falling within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a programmed controller or computer. Those skilled in the relevant art will appreciate that aspects of the present disclosure can be practiced with other communications, data processing, or computer system configurations, including: Internet appliances, hand-held devices, etc.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium.

It will be apparent to those skilled in the art that various modifications and variations can be made to the disclosed method and system without departing from the scope of the disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method for monitoring operation of a machine, the method comprising:
receiving machine operation data including a first data channel indicative of a sensed condition at a first location on the machine, wherein the machine operation data is collected during one or more work cycles of the machine;
extracting at least a portion of the machine operation data, including data associated with the first data channel;
classifying the extracted machine operation data to identify one or more types of events that occurred during the one or more work cycles of the machine and involving an environment in which the machine operates during the one or more work cycles of the machine, wherein a trained machine learning model identifies the one or more types of events by classifying the extracted machine operation data, the machine learning model having been trained based on training data including at least one of: one or more simulated events or measured data associated with one or more predetermined events;

estimating a condition at a second location on the machine during the one or more work cycles of the machine based on the identified one or more types of events; and logging the identified one or more types of events with a plurality of additional identified types of events to represent a plurality of work cycles during operation of the machine over time.

2. The method of claim 1, wherein identifying the one or more types of events is performed with a trained machine learning model that maps the extracted machine operation data according to one or more predetermined types of events.

3. The method of claim 1 wherein the one or more simulated events include events simulated by use of a multi-body dynamics simulation that includes structural responses of the machine through the use of flexible bodies.

4. The method of claim 1, wherein the first data channel includes strain data measured by a sensor at the first location on the machine, and wherein the second location on the machine does not include a sensor.

5. The method of claim 1, wherein the one or more types of events comprise events that affect structural functioning of the machine, damage events, and/or wear events, the method further comprising:

quantifying, via a regression analysis, a damage estimate at the first location and a damage estimate at the second location based on the identified one or more types of events.

6. The method of claim 1, wherein the machine operation data comprises a second data channel indicative of at least one of an amount of load on the machine, a lateral acceleration or velocity of the machine, a travel-direction acceleration or velocity of the machine, or a strut pressure.

7. The method of claim 1, wherein the one or more types of events is identified when the machine operation data includes a value that exceeds a predetermined threshold or a waveform that corresponds to an expected waveform.

8. The method of claim 1, further including displaying a heatmap illustrating locations where the one or more types of events occurred.

9. The method of claim 1, wherein the one or more types of events include dumping, loading, or encountering: a pothole, an incline, a decline, or a wall.

10. A system for monitoring operation of a machine, comprising:

at least one processor; and at least one non-transitory computer readable medium storing instructions which, when executed by the at least one processor, cause the at least one processor to perform operations including:

receiving machine operation data, via an input circuitry, including a first data channel indicative of a sensed condition at a first location on the machine, the machine operation data corresponding to one or more work cycles of the machine;

extracting, via a data extraction circuitry, at least a portion of the machine operation data, including data associated with the first data channel;

identifying, via an event identification circuitry, one or more types of events involving an environment in which the machine operates and that occurred during the one or more work cycles of the machine by classifying the extracted machine operation data wherein identifying the one or more types of events is performed at least in part with a trained machine learning model that identifies the one or more types of events by classifying the extracted machine operation data based on training data used to train the trained machine learning model, the training data including at least one of: one or more simulated events or measured data associated with one or more predetermined events;

estimating, via a condition estimation circuitry, a condition at a second location on the machine during the one or more work cycles of the machine based on the identified one or more types of events; and logging, via an event logging circuitry, the identified one or more types of events with a plurality of additional identified types of events to represent a plurality of work cycles during operation of the machine over time.

11. The system of claim 10, wherein the trained machine learning model classifies the extracted machine operation data according to one or more predetermined types of events and the training data includes the one or more simulated events.

12. The system of claim 10, wherein the one or more simulated events include events simulated by use of a multi-body dynamics simulation of the machine.

13. The system of claim 10, wherein the first data channel includes strain data measured by a sensor at the first location of the machine, and wherein the second location on the machine does not include a sensor.

14. The system of claim 10, wherein the one or more types of events comprise any event that affects structural functioning of the machine.

15. The system of claim 10, wherein the one or more types of events comprise structural damage events, wear events, or both, to the machine, and the operations further comprising:

quantifying, via a regression analysis, a damage estimate at the first location and a damage estimate at the second location based on the identified one or more types of events.

16. The system of claim 10, wherein the machine operation data comprises a second data channel indicative of at least one of an amount of load on the machine, a lateral acceleration or velocity of the machine, a travel-direction acceleration or velocity of the machine, or a strut pressure.

17. A method for monitoring an operation of a machine, the method comprising:

receiving machine operation data corresponding to one or more work cycles of the machine;

identifying one or more events in the machine operation data that occurred during the one or more work cycles of the machine and involved an environment of the machine;

classifying the identified one or more events with a type of event via a trained machine learning model, the machine learning model having been trained based on training data including at least one of: one or more simulated events or measured data associated with one or more predetermined events;

determining an amount of damage at a location of the machine during the one or more work cycles of the machine based on the type of event, wherein no sensor is present at the location; and monitoring the operation of the machine over time by storing the type of event and a plurality of additional types of events in one or more databases.

18. The method of claim 17, wherein the trained machine learning model classifies with types of events according to training data used to train the trained machine learning model, the training data including one or more events simulated by use of a physics-based simulation of the machine.

19. The method of claim 17, wherein the type of event comprises a damage event, a wear event, or both, to the machine.

20. The method of claim 17, wherein the machine operation data comprises data received from an engine control module associated with the machine and sensor data received from at least one of a strut pressure sensor, an accelerometer, a speed sensor, or a strain sensor.

* * * * *